United States Patent
Nielsen et al.

(10) Patent No.: US 10,255,063 B2
(45) Date of Patent: Apr. 9, 2019

(54) PROVIDING SOURCE CONTROL OF CUSTOM CODE FOR A USER WITHOUT PROVIDING SOURCE CONTROL OF HOST CODE FOR THE USER

(71) Applicant: Microsoft Technology Licensing, LLC, Redmond, WA (US)

(72) Inventors: Henrik Frystyk Nielsen, Hunts Point, WA (US); Chen Egozi, Redmond, WA (US); Jason M. Allor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1228 days.

(21) Appl. No.: 13/839,815

(22) Filed: Mar. 15, 2013

(65) Prior Publication Data

US 2014/0282397 A1    Sep. 18, 2014

(51) Int. Cl.
*G06F 8/71*    (2018.01)
(52) U.S. Cl.
CPC ..................................... *G06F 8/71* (2013.01)
(58) Field of Classification Search
CPC ................................... G06F 8/70; G06F 8/71
USPC ...................... 717/101, 120, 168, 121, 122
See application file for complete search history.

(56) References Cited

U.S. PATENT DOCUMENTS

| | | | | |
|---|---|---|---|---|
| 6,662,357 B1 * | 12/2003 | Bowman-Amuah | ......... | 717/120 |
| 8,219,977 B1 * | 7/2012 | Stroomer | ...................... | 717/124 |
| 8,234,620 B1 * | 7/2012 | Bychkov et al. | ............. | 717/100 |
| 2008/0163266 A1 * | 7/2008 | Schmidt et al. | .............. | 719/328 |
| 2012/0229499 A1 | 9/2012 | Tsao et al. | | |
| 2013/0346945 A1 * | 12/2013 | Yousouf | .................... | G06F 8/36 717/121 |

OTHER PUBLICATIONS

Tiwari, Ajay., "Writing Custom Code—Your Code, Our Cloud", Retrieved at <<http://blogs.shephertz.com/tag/custom-code/>>, Dec. 27, 2012, pp. 3.
Perez, Sarah., "Microsoft Launches Windows Azure Mobile Services: A Cloud Backend for Windows 8 and Mobile Apps", Retrieved at <<http://techcrunch.com/2012/08/28/microsoft-launches-windows-azure-mobile-services-a-cloud-backend-for-windows-8-apps-ios-android-windows-phone-support-planned/>>, Aug. 28, 2012, pp. 3.
Sikka, Sandeep., "Kinvey's Architecture and the Backend as a Service Ecosystem", Retrieved at <<http://www.kinvey.com/blog/123/kinveys-architecture-and-the-backend-as-a-service-ecosystem>>, Aug. 2, 2012, pp. 6.

(Continued)

*Primary Examiner* — Li B. Zhen
*Assistant Examiner* — Zengpu Wei
(74) *Attorney, Agent, or Firm* — Wade IP Law LLC (57) ABSTRACT

Techniques are described herein that are capable of providing source control of custom code in a backend-as-a-service (BaaS) module. For instance, the custom code may be automatically loaded dynamically (e.g., on-demand) in a runtime that is hosted by the BaaS module while the runtime is running to provide custom backend features that are defined by the custom code to an application in response to receipt of a request from the application. Source control of the custom code may be provided without providing source control of host code that defines the runtime.

20 Claims, 6 Drawing Sheets

(56) References Cited

OTHER PUBLICATIONS

Tan, Aaron., "FatFractal ups the ante in backend-as-a-service market", Retrieved at <<http://www.techgoondu.com/2012/09/30/fatfractal-ups-the-ante-in-backend-as-a-service/#.UUKqFLUcyYQ>>, Sep. 30, 2012, pp. 4.

Williams, Alex., "Kii Cloud Opens Doors for Mobile Developer Platform with 25 Million End Users", Retrieved at <<http://techcrunch.com/2012/10/11/kii-cloud-opens-doors-for-mobile-developer-platform-with-25-million-end-users/>>, Oct. 11, 2012, pp. 3.

Lawton, George., "Developing Software Online With Platform-as-a-Service Technology", Retrieved at <<http://ieeexplore.ieee.org/stamp/stamp.jsp?tp=&arnumber=4548165>>, In computer vol. 41, Issue 6, Jun. 2008, pp. 3.

\* cited by examiner

PROVIDING SOURCE CONTROL OF CUSTOM CODE FOR A USER WITHOUT PROVIDING SOURCE CONTROL OF HOST CODE FOR THE USER

BACKGROUND

Writing a secure, scalable cloud backend for an application (e.g., a mobile application) is relatively difficult. For instance, a developer typically performs a substantial amount of set up to get a web service application backend configured and running in the cloud. Consequently, many companies recently have begun to provide Backend-as-a-Service (BaaS) solutions in the cloud Companies that offer BaaS solutions are referred to as BaaS providers. Such BaaS providers generally try to simplify development of applications by providing turnkey solutions for common needs such as analytics, authentication, authorization, collaboration, data processing, persistent storage, push notifications, social networking, user management, etc. By using BaaS solutions, developers may focus on developing their application logic, rather than spending a substantial amount of time building the foundational backend for hosting their application logic.

Some BaaS solutions are beginning to allow custom code to be run in their solutions. However, such solutions often do not support source control. Accordingly, software developers are sometimes left to maintain a separate source control. Moreover, if source control is supported, such source control traditionally exposes host code along with the custom code.

SUMMARY

Various approaches are described herein for, among other things, providing source control of custom code in a backend-as-a-service (BaaS) module without providing source control of host code that defines a runtime hosted by the BaaS module.

An example method is described. In accordance with this method, custom code is received for incorporation into a BaaS module that is configured to provide a backend service to a corresponding application. Source control of the custom code I provided without providing source control of host code. The host code defines a runtime that is hosted by the BaaS module. The host code is configured to load the custom code into the runtime while the runtime is running to provide custom backend features that are defined by the custom code to the corresponding application.

An example system is described that includes an interface and selective source control logic. The interface is configured to receive custom code for incorporation into a BaaS module that is configured to provide a backend service to a corresponding application. The selective source control logic is configured to provide source control of the custom code without providing source control of host code. The host code defines a runtime that is hosted by the BaaS module. The host code is configured to load the custom code into the runtime while the runtime is running to provide custom backend features that are defined by the custom code to the corresponding application.

A computer program product is described that includes a computer-readable medium having computer program logic recorded thereon for enabling a processor-based system to provide source control of custom code in a BaaS module. The computer program product includes a program logic module for enabling the processor-based system to provide the source control of the custom code without providing source control of host code. The custom code is received for incorporation into the BaaS module which is configured to provide a backend service to a corresponding application. The host code defines a runtime that is hosted by the BaaS module. The host code is configured to load the custom code into the runtime while the runtime is running to provide custom backend features that are defined by the custom code to the corresponding application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of providing source control of custom code in a backend-as-a-service (BaaS) module without providing source control of host code that defines a runtime (e.g., a Web application) hosted by the BaaS module.

Example techniques described herein have a variety of benefits as compared to conventional backend-as-a-service (BaaS) techniques. For instance, the example techniques may be capable of enabling a software developer to have source control of custom code (e.g., business logic) within a BaaS module and not host code within the BaaS module. Accordingly, the example techniques may allow the software developer to have access (e.g., view and/or makes changes) to the custom code while preventing the software developer from having access to the host code. A software developer may therefore enjoy the flexibility and/or power of a source control-based deployment for his/her custom code while a BaaS provider retains control of the host code.

Figure 1:
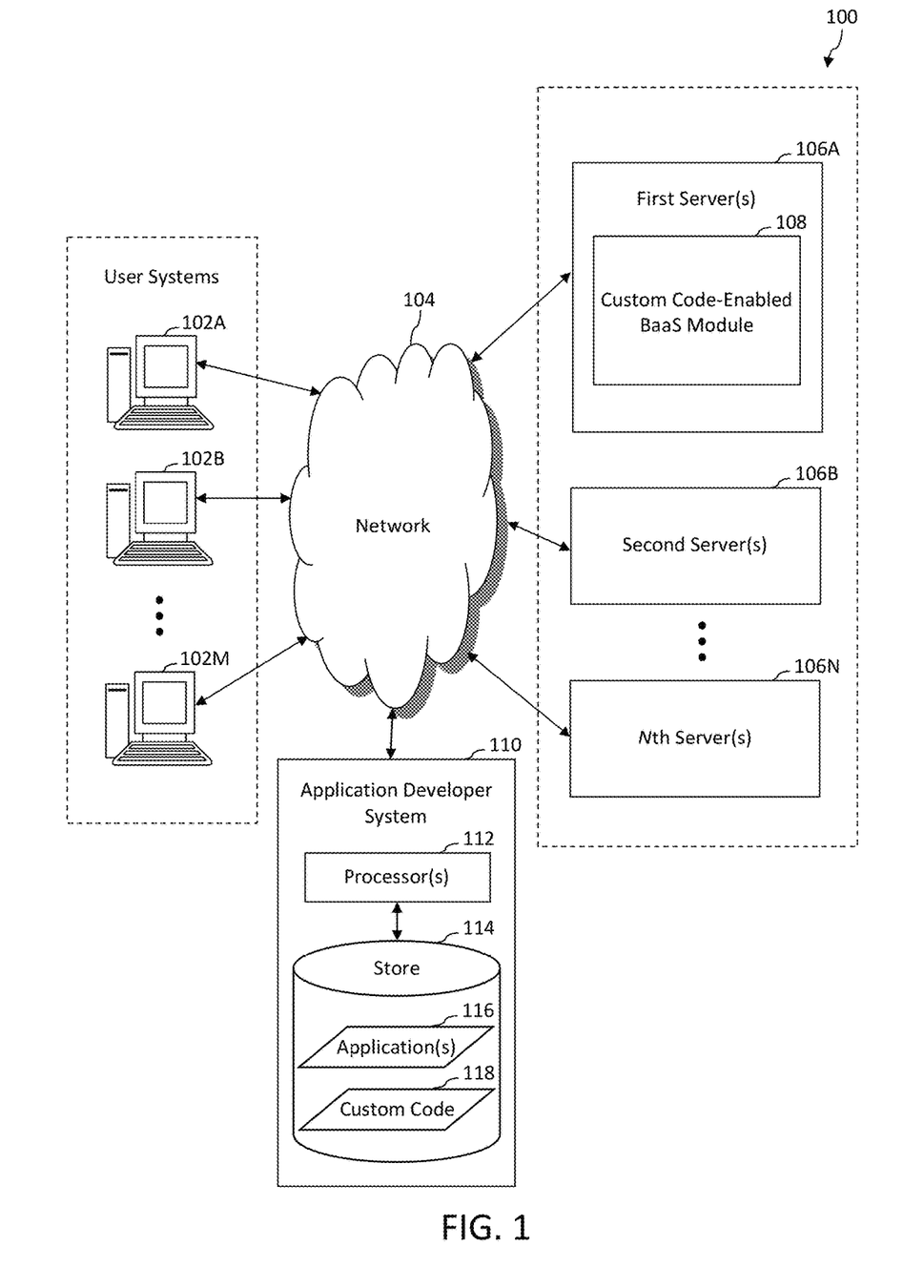
FIG. 1 is a block diagram of an example networked system in accordance with an embodiment.

FIG. 1 is a block diagram of an example networked system 100 in accordance with an embodiment. Generally speaking, networked system 100 operates to provide information to users in response to requests (e.g., hypertext transfer protocol (HTTP) requests) that are received from the users. The information may include documents (e.g., Web pages, images, video files, etc.), output of executables, and/or any other suitable type of information. In accordance with example embodiments described herein, networked system 100 provides backend custom code extensibility. Such extensibility allows custom code to be automatically loaded dynamically in a runtime that is hosted by a BaaS module while the runtime is running to provide custom backend features that are defined by the custom code to an application in response to receipt of a request from the application. In further accordance with example embodiments described herein, networked system 100 provides source control of the custom code without providing source control of host code that defines the runtime. For instance, the host code may be configured to expose a public API of the runtime to consume applications. Detail regarding techniques for providing source control of custom code without providing source control of host code is provided in the following discussion.

As shown in FIG. 1, networked system 100 includes a plurality of user systems 102A-102M, a network 104, a plurality of servers 106A-106N, and an application developer system 110. Communication among user systems 102A-102M, servers 106A-106N, and application developer system 110 is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 106A-106N, so that user systems 102A-102M may access information that is available via the domains. Such domain may include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, video files, etc.), output of executables, or any other suitable type of information. In accordance with some example embodiments, servers 106A-106N are configured to host respective Web sites, so that the Web sites are accessible to users of networked system 100.

One example type of computer program that may be executed by one or more of servers 106A-106N is a developer tool. A developer tool is a computer program that performs diagnostic operations (e.g., identifying source of problem, debugging, profiling, controlling, etc.) with respect to program code. Examples of a developer tool include but are not limited to a web development platform (e.g., Windows Azure Platform®, Amazon Web Services®, Google App Engine®, VMWare®, Force.Com®, etc.) and an integrated development environment (e.g., Microsoft Visual Studio®, JDeveloper®, NetBeans®, Eclipse Platform™, etc.). It will be recognized that the example techniques described herein may be implemented using a developer tool.

First server(s) 106A is shown to include a custom code-enabled backend-as-a-service (BaaS) module 108 for illustrative purposes. Custom code-enabled BaaS module 108 is configured to provide a backend service to an application. Custom code-enabled BaaS module 108 is further configured to accept custom code for incorporation into custom code-enabled BaaS module 108. For instance, custom code may be received at custom code-enabled BaaS module 108 from a software developer (e.g., application developer system 110 described below) for incorporation into custom code-enabled BaaS module 108. When a user system (e.g., any of user systems 102A-102M) runs the application, the application may initiate a request for the backend service of custom code-enabled BaaS module 108. Upon receipt of the request, custom code-enabled BaaS module 108 may load the custom code dynamically in a runtime that is hosted by custom code-enabled BaaS module 108 to provide custom backend features that are defined by the custom code to the application (e.g., in addition to non-custom backend features inherent to custom code-enabled BaaS module 108). In this manner, the application running on the user system and the runtime which incorporates the custom code may collaboratively provide a rich user experience.

Custom code-enabled BaaS module 108 is further configured to provide source control of the custom code without providing source control of host code that defines the runtime. For instance, custom code-enabled BaaS module 108 may enable the software developer who provided the custom code to control (e.g., modify) the custom code; however, custom code-enabled BaaS module 108 may not enable the software developer to control the host code.

It will be recognized that custom code-enabled BaaS module 108 may be (or may be included in) a developer tool, though the scope of the example embodiments is not limited in this respect. Example techniques for provide source control of custom code without providing source control of host code are discussed in greater detail below with reference to FIGS. 2-6.

Application developer system 110 is a processing system that is capable of providing custom code to custom code-enabled BaaS module 108. Application developer system 110 includes processor(s) 112 and store 114. Processor(s) 112 are capable of developing application(s) 116 and custom code 118 in response to instructions from a software developer. Store 114 is configured to store the application(s) 116, the custom code 118, and other suitable information. Such other information may include software development kits (SDKs), for example. An SDK provides functionality for an application (a.k.a. a connected client) to communicate with custom code-enabled BaaS module 108. The SDK is tailored to each backend service and connects endpoints automatically without a software developer having to do additional work. Store 114 may be any suitable type of store, including but not limited to a database (e.g., a relational database, an entity-relationship database, an object database, an object relational database, an XML database, etc.). One application developer system 110 is shown in FIG. 1 for purposes of illustration and is not intended to be limiting. It will be recognized that networked system 100 may include any suitable number (e.g., 1, 2, 3, etc.) of application developer systems, each capable of providing custom code to custom code-enabled BaaS module 108.

Application developer system 110 may provide the custom code 118 to custom code-enabled BaaS module via an interface, such as a web portal and/or command line tool(s) of custom code-enabled BaaS module 108, and/or via direct code push to a runtime in custom code-enabled BaaS module 108. The end result is that custom code-enabled BaaS module 108 is aware of the custom code 118 and knows how to run the custom code 118 at the right times.

Custom code-enabled BaaS module 108 may be implemented in various ways to provide source control of custom code without providing source control of host code, including being implemented in hardware, software, firmware, or any combination thereof. For example, custom code-enabled BaaS module 108 may be implemented as computer program code configured to be executed in one or more processors. In another example, custom code-enabled BaaS module 108 may be implemented as hardware logic/electrical circuitry. In an embodiment, custom code-enabled BaaS module 108 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Custom code-enabled BaaS module 108 is shown to be incorporated in first server(s) 106A for illustrative purposes and is not intended to be limiting. It will be recognized that custom code-enabled BaaS module 108 may be distributed among the two or more of server(s) 106A-106N.

Figure 2:
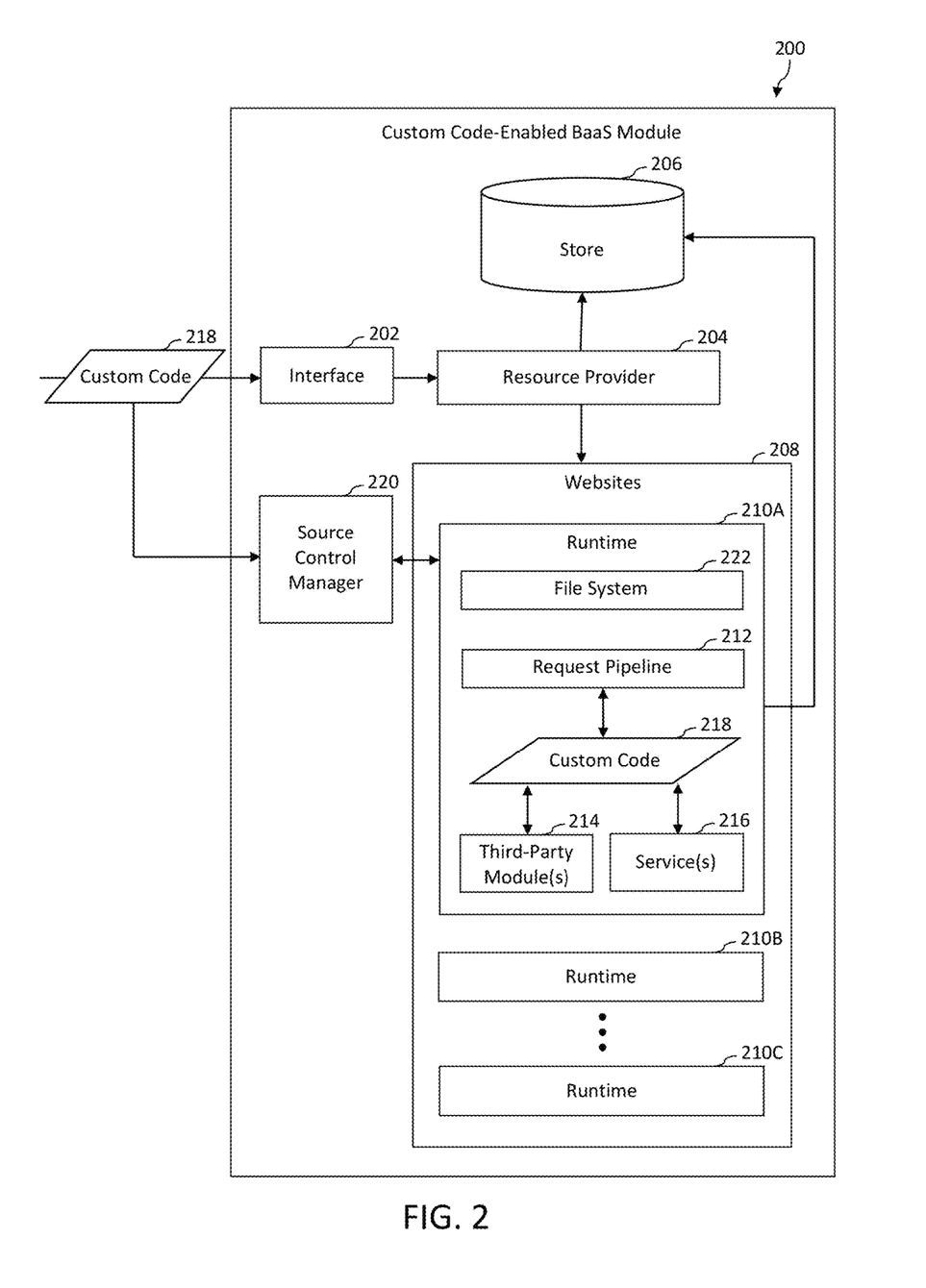
FIG. 2 is a block diagram of an example implementation of a custom code-enabled BaaS module in accordance with an embodiment.

FIG. 2 is a block diagram of an example implementation of a custom code-enabled BaaS module in accordance with an embodiment. As shown in FIG. 2, custom code-enabled BaaS module 200 includes an interface 202, a resource provider 204, a store 206, websites 208, and a source control manager 220. Interface 202 is configured to receive custom code 218 (e.g., from application developer system 110). For example, interface 202 may include a browser-based portal, command line utilities, etc. Interface 202 forwards the custom code 218 to resource provider 204 for further processing. It will be recognized that interface 202 is shown for illustrative purposes, and custom code-enabled BaaS module need not necessarily include interface 202. For instance, a software developer may communicate with websites 208 via source control manager 220 (e.g., using a push operation).

Resource provider 204 is configured to provision runtimes to run within a cloud environment. For example, resource provider 204 provisions runtimes 210A-210C to run in websites 208. In accordance with this example, resource provider 204 may configure runtimes 210A-210C based on user preferences for handling backend features including but not limited to authentication, user and device management, push notifications, scheduled tasks, etc. In addition to configuring runtimes 210A-210C, resource provider 204 is capable of pushing custom code (a.k.a. code snippets or scripts) to runtimes 210A-210C. For instance, custom code 218 is shown in FIG. 2 to have been pushed to runtime 210A by resource provider 204. The custom code 218 may include one or more custom code extensions, such as table script(s), cron script(s), application programming interface (API) script(s), shared script(s), etc.

Runtime 210A handles business logic specific to an application that corresponds to the custom code 218. For example, client-side aspects of the application may run on a user system (e.g., any of user systems 102A-102M), and server-side aspects of the application, including the custom code 218, may run in runtime 210A. By enabling a software developer to directly add behavior to runtime 210A, it is possible to hook in an open-ended set of features that the software developer can leverage as part of the overall application.

Resource provider 204 may be implemented as a Web API exposing a representational state transfer-style (REST-style) API which is accessible using a language such as JavaScript™ Object Notation (JSON) or extensible markup language (XML), though the scope of the example embodiments are not limited in this respect. Such a REST-style API allows resource provider 204 to be configured by a variety of clients ranging from a browser-based portal-like experience to command line utilities. The Web resources that resource provider 204 exposes provide workflows for creating, provisioning, monitoring and tracking applications (e.g., a Windows Azure® Mobile Application). Resource provider 204 maintains the state of each application in store 206.

Store 206 is configured to store the state of each application. Store 206 may be any suitable type of store. One type of store is a database. For example, store 206 may be a relational database, an entity-relationship database, an object database, an object relational database, an extensible markup language (XML) database, etc. In accordance with this example, store 206 may be a persistent database.

Source control manager 220 manages versions of the custom code 218. For instance, when a software developer makes a change to the custom code 218, source control manager 220 records the change. Each of the runtimes 210A-210C may have its own source control manager. Accordingly, source control manager 220 may be configured to serve only runtime 210A, though the scope of the example embodiments is not limited in this respect. Source control manager 220 provides source control functionality that runtime 210A leverages to in accordance with the example embodiments described herein to provide such functionality of the custom code 218 without providing the functionality of the host code that defines runtime 210A.

A software developer may use the aforementioned source control functionality at interface 202 or at his/her workstation (using a source control tool). At interface 202, the software developer may push a button, for example, to go back to a previous version of the custom code 218. A handler may be exposed to bypass the need for the software developer to know that the custom code 218 is source controlled. A source control application programming interface (API) is used when the software developer uses a source control tool on his/her workstation.

It should be noted that resource provider 204 and source control manager 220 include committing code, which is capable of making the custom code "source control commit", rather than merely a file to save. The "source control commit" includes a history of changes that are made to the custom code.

Custom code-enabled BaaS module 200 hosts websites 208 in which runtimes 210A-210C run. Each of the runtimes 210A-210C is a dedicated service running the backend functionality of an application. Runtime 210A is shown to include a file system 222, a request pipeline 212, custom code 218 automatically loaded dynamically at runtime by resource provider 204, third-party module(s) 214 (e.g., node.js modules), and service(s) 216. File system 222 is configured to store the custom code 218 and host code that defines runtime 210A in separate folders in order to facilitate selective source control. For example, file system 222 stores the host code in a first folder. File system 222 stores the custom code 218 in a second folder. In accordance with this example, the second folder may be a sub-folder of the first folder. Runtime 210A may provide source control functionality with regard to the custom code 218 in the second folder. For instance, runtime 210A may use a hook to source control manager 220 to provide such source control functionality. Runtime 210A may not provide source control functionality with regard to the host code in the first folder. File system 222 may copy the custom code 218 from the second folder to a third folder, which is accessible by request pipeline for incorporating the custom code 218 into the runtime while the runtime is running.

Request pipeline 212 receives incoming requests from an application. Request pipeline 212 handles such aspects as authentication, push notification, database access and data model definition. The aforementioned aspects are provided for illustrative purposes and are not intended to be limiting. It will be recognized that request pipeline 212 may handle any suitable aspects of the backend functionality of custom code-enabled BaaS module 200. The custom code 218 is loaded and run at particular points (referred to as "extensibility points") along request pipeline 212 by runtime 210A. It should be noted that runtime 210A monitors the custom code 218 while the custom code 218 runs to ensure that the application remains responsive in case of a failure and/or bug in the custom code 218. Error messages and status updates are logged along the request pipeline 212 by resource provider 204 in a way that the software developer can inspect. Within runtime 210A, the custom code 218 is capable of communicating with third-party module(s) 214 and service(s) 216 (e.g., build-in service(s)).

Runtime 210A may be configured to expose any of a variety of endpoints which connected endpoints can access:

/login: The login endpoint supports authentication of a user using a number of popular Internet Identity Providers.

/table: The table endpoint exposes a structured, persistent storage which connected applications can use for storing or accessing data that is part of the application.

/jobs: The jobs endpoint exposes a scheduled task which can be run at a predetermined point in time or in a "run-now" mode.

/status: The status endpoint exposes information about runtime 210A and how runtime 210A performs.

/api: The api endpoint exposes software developer-defined "custom APIs". The software developer authors a custom code script which can expose one or more "methods" (e.g., scores, topScores, etc.). The methods are then accessible at endpoints, such as /api/scores, /api/topScores, etc.

It will be recognized that custom code-enabled BaaS module 200 may not include one or more of the components shown in FIG. 2. For instance, custom code-enabled BaaS module 200 may not include any one or more of interface 202, resource provider 204, store 206, websites 208, third-party module(s) 214, and/or service(s) 216. Furthermore, custom code-enabled BaaS module 200 may include component(s) in addition to or in lieu of those shown in FIG. 2.

Figure 3:
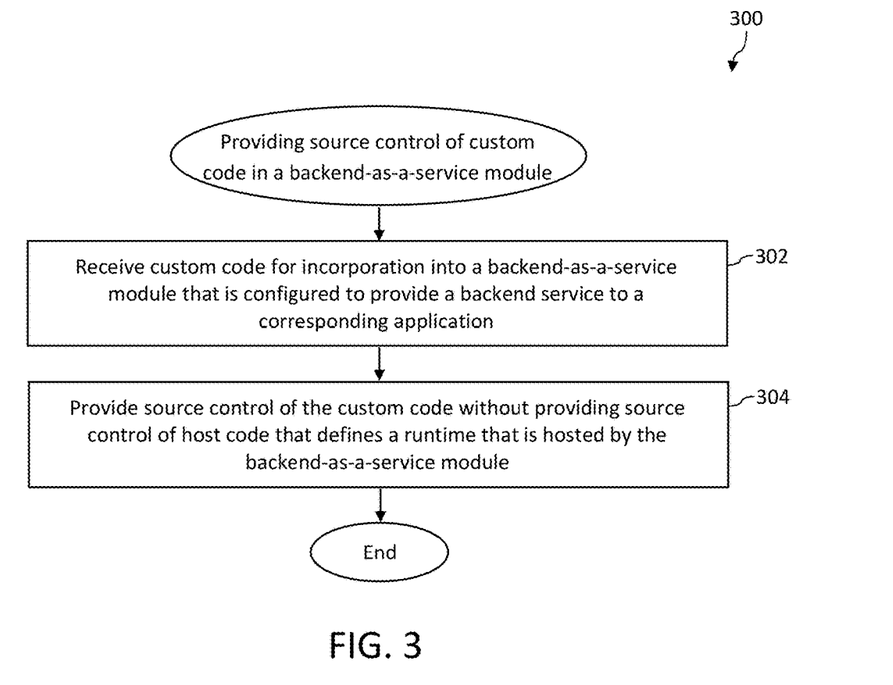
FIGS. 3 and 4 depict flowcharts of example methods for providing source control of custom code in a backend-as-a-service (BaaS) module without providing source control of host code that defines a runtime hosted by the BaaS module in accordance with embodiments.
Figure 4:
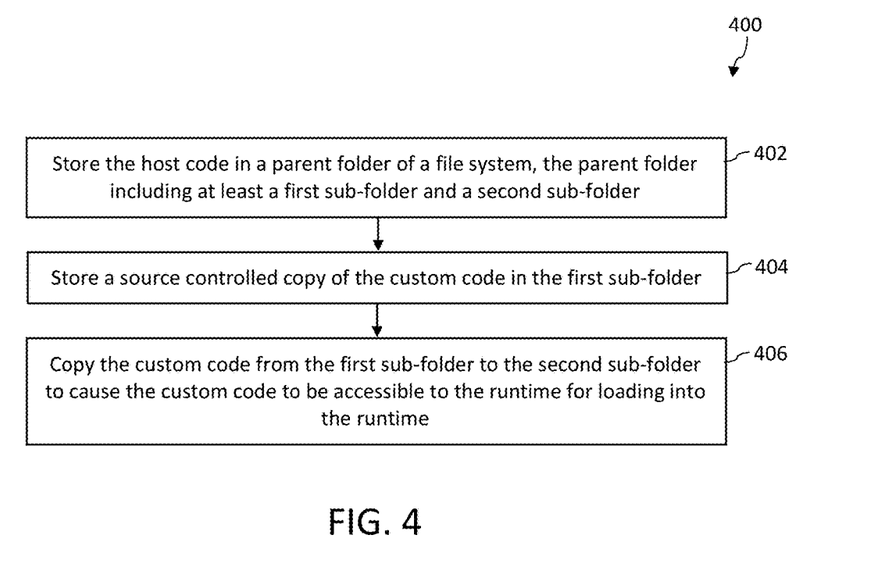
Figure 5:
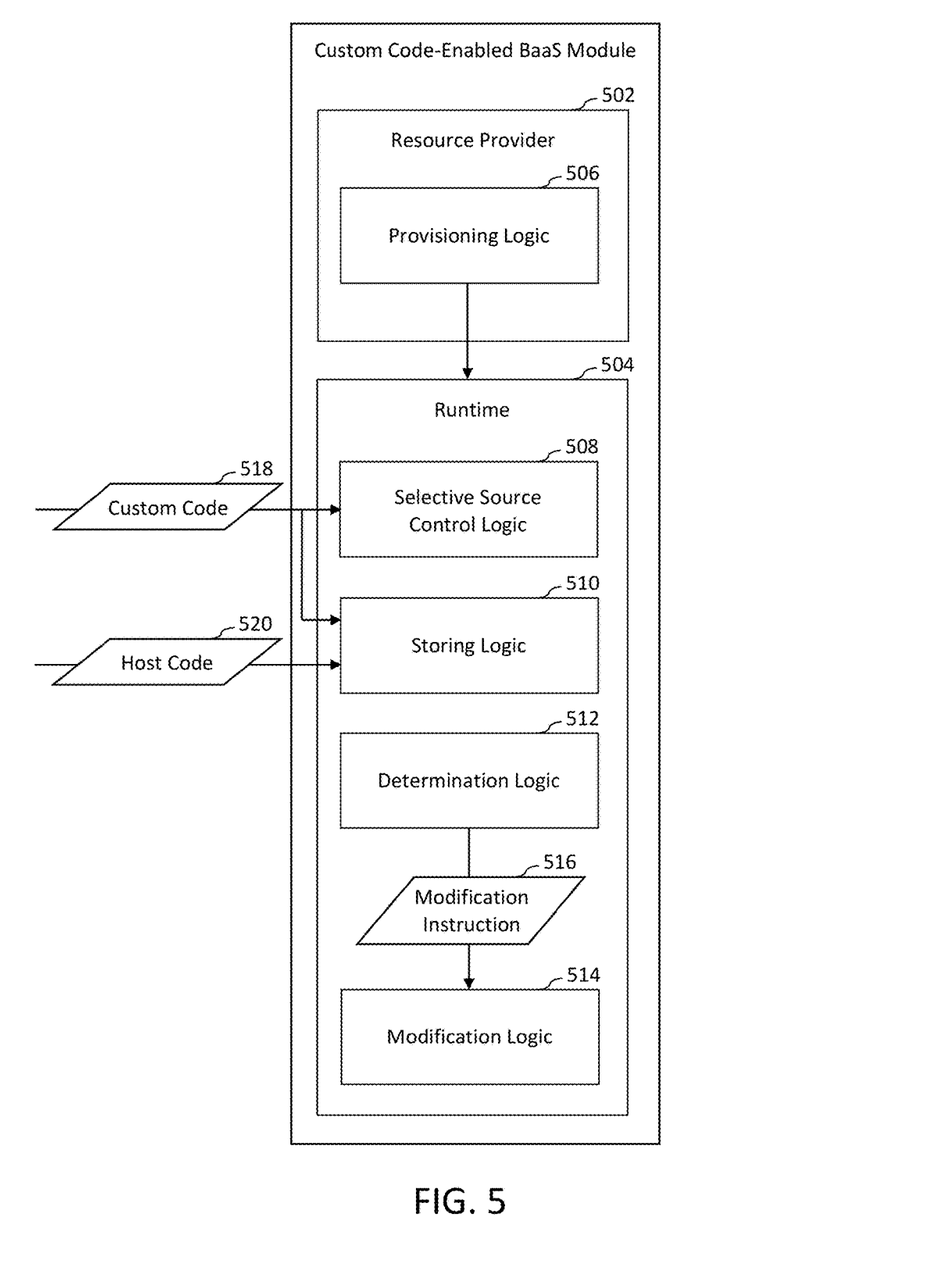
FIG. 5 is a block diagram of an example implementation of a custom code-enabled BaaS module shown in FIGS. 1 and 2 in accordance with an embodiment.

FIGS. 3 and 4 depict flowcharts 300 and 400 of example methods for providing source control of custom code in a backend-as-a-service (BaaS) module without providing source control of host code that defines a runtime hosted by the BaaS module in accordance with embodiments. Flowcharts 300 and 400 may be performed by custom code-enabled BaaS module 108 shown in FIG. 1 or custom code-enabled BaaS module 200 shown in FIG. 2, for example. For illustrative purposes, flowcharts 300 and 400 are described with respect to custom code-enabled BaaS module 500 shown in FIG. 5, which is an example of custom code-enabled BaaS modules 108 and 200, according to an embodiment. As shown in FIG. 5, custom code-enabled BaaS module 500 includes resource provider 502 and runtime 504. Resource provider 502 includes provisioning logic 506. Runtime 504 includes selective source control logic 508, storing logic 510, determination logic 512, and modification logic 514. Further structural and operational embodiments will be apparent to persons skilled in the relevant art(s) based on the discussion regarding flowcharts 300 and 400.

As shown in FIG. 3, the method of flowchart 300 begins at step 302. In step 302, custom code is received for incorporation into a backend-as-a-service module that is configured to provide a backend service to a corresponding application. In an example implementation, selective source control logic 508 receives custom code 518 for incorporation into custom code-enabled BaaS module 500.

In an example embodiment, the custom code 518 is received from a user (e.g., a software developer). In an aspect of this embodiment, selective source control logic 508 may receive the custom code 518 from the user via resource provider 502, which provisioned runtime 504. For instance, provision logic 506 may have provisioned runtime 504. In another aspect of this embodiment, selective source control logic 508 may receive the custom code 518 via a source control application programming interface (API).

At step 304, source control of the custom code is provided without providing source control of host code that defines a runtime that is hosted by the backend-as-a-service module. The host code is configured to load the custom code into the runtime while the runtime is running (e.g., without interrupting the running of the runtime) to provide custom backend features that are defined by the custom code to the corresponding application. In an example implementation, selective source control logic 508 provides source control of the custom code 518 without providing source control of host code that defines runtime 504, which is hosted by custom code-enabled BaaS module 500.

In some example embodiments, one or more steps 302 and/or 304 of flowchart 300 may not be performed. Moreover, steps in addition to or in lieu of steps 302 and/or 304 may be performed. For instance, in an example embodiment, flowchart 300 includes the steps shown in flowchart 400 of FIG. 4. As shown in FIG. 4, the method of flowchart 400 begins at step 402. In step 402, the host code is stored in a parent folder of a file system. The parent folder includes at least a first sub-folder and a second sub-folder. In an example implementation, storing logic 510 stores host code 520 in the parent folder.

At step 404, a source controlled copy of the custom code is stored in the first sub-folder. The source controlled copy is a copy of the custom code for which source control functionality is provided for the user. In an example implementation, storing logic 510 stores a source controlled copy of the custom code 518 in the first sub-folder.

At step 406, the custom code is copied from the first sub-folder to the second sub-folder to cause the custom code to be accessible to the runtime for loading into the runtime. In an example implementation, storing logic 510 copies the custom code 518 from the first sub-folder to the second sub-folder to cause the custom code 518 to be accessible to the runtime 504 for loading into the runtime 504.

In an aspect of this embodiment, flowchart 300 further includes determining that one or more files are added to the source controlled copy of the custom code in the first sub-folder, and copying (e.g., automatically copying) the one or more files from the first sub-folder to the second sub-folder (e.g., while the runtime is running) in response to determine that the one or more files are added to the source controlled copy. In an example implementation, determination logic 512 determines that the one or more files are added to the source controlled copy. Determination logic 512 may generate a modification instruction 516, indicating that the one or more files are to be copied from the first sub-folder to the second sub-folder. In accordance with this implementation, modification logic 514 copies the one or more files from the first sub-folder to the second sub-folder. For instance, modification logic 514 may copy the one or more files from the first sub-folder to the second sub-folder based on receipt of the modification instruction 516.

In another aspect of this embodiment, flowchart 300 further includes determining that one or more files are deleted from the source controlled copy of the custom code in the first sub-folder, and deleting (e.g., automatically deleting) the one or more files from the custom code in the second sub-folder (e.g., while the runtime is running) in response to determine that the one or more files are deleted from the source controlled copy. In an example implementation, determination logic 512 determines that the one or more files are deleted from the source controlled copy of the custom code in the first sub-folder. Determination logic 512 may generate a modification instruction 516, indicating that the one or more files are to be deleted from the custom code in the second sub-folder. In accordance with this implementation, modification logic 514 deletes the one or more files from the custom code in the second sub-folder. For instance, modification logic 514 may delete the one or more files from the custom code in the second sub-folder based on receipt of the modification instruction 516.

In another aspect of this embodiment, flowchart 300 further includes determining that at least one change is made to at least one file in the source controlled copy of the custom code in the first sub-folder, and updating (e.g., automatically updating) the corresponding at least one file in the second sub-folder to include the at least one change (e.g., while the runtime is running) in response to determine that the at least one change is made to the at least one file in the source controlled copy. In an example implementation, determination logic 512 determines that at least one change is made to at least one file in the source controlled copy of the custom code in the first sub-folder. Determination logic 512 may generate a modification instruction 516, indicating that the corresponding at least one file in the second sub-folder is to include the at least one change. In accordance with this implementation, modification logic 514 updates the corresponding at least one file in the second sub-folder to include the at least one change. For instance, modification logic 514 may updates the corresponding at least one file in the second sub-folder based on receipt of the modification instruction 516.

It will be recognized that custom code-enabled BaaS module 500 may not include all of the components shown in FIG. 5. For instance, custom code-enabled BaaS module 500 may not include one or more of resource provider 502, provisioning logic 506, selective source control logic 508, storing logic 510, determination logic 512, and/or modification logic 514. Furthermore, custom code-enabled BaaS module 500 may include components in addition to or in lieu of resource provider 502, provisioning logic 506, selective source control logic 508, storing logic 510, determination logic 512, and/or modification logic 514.

Figure 6:
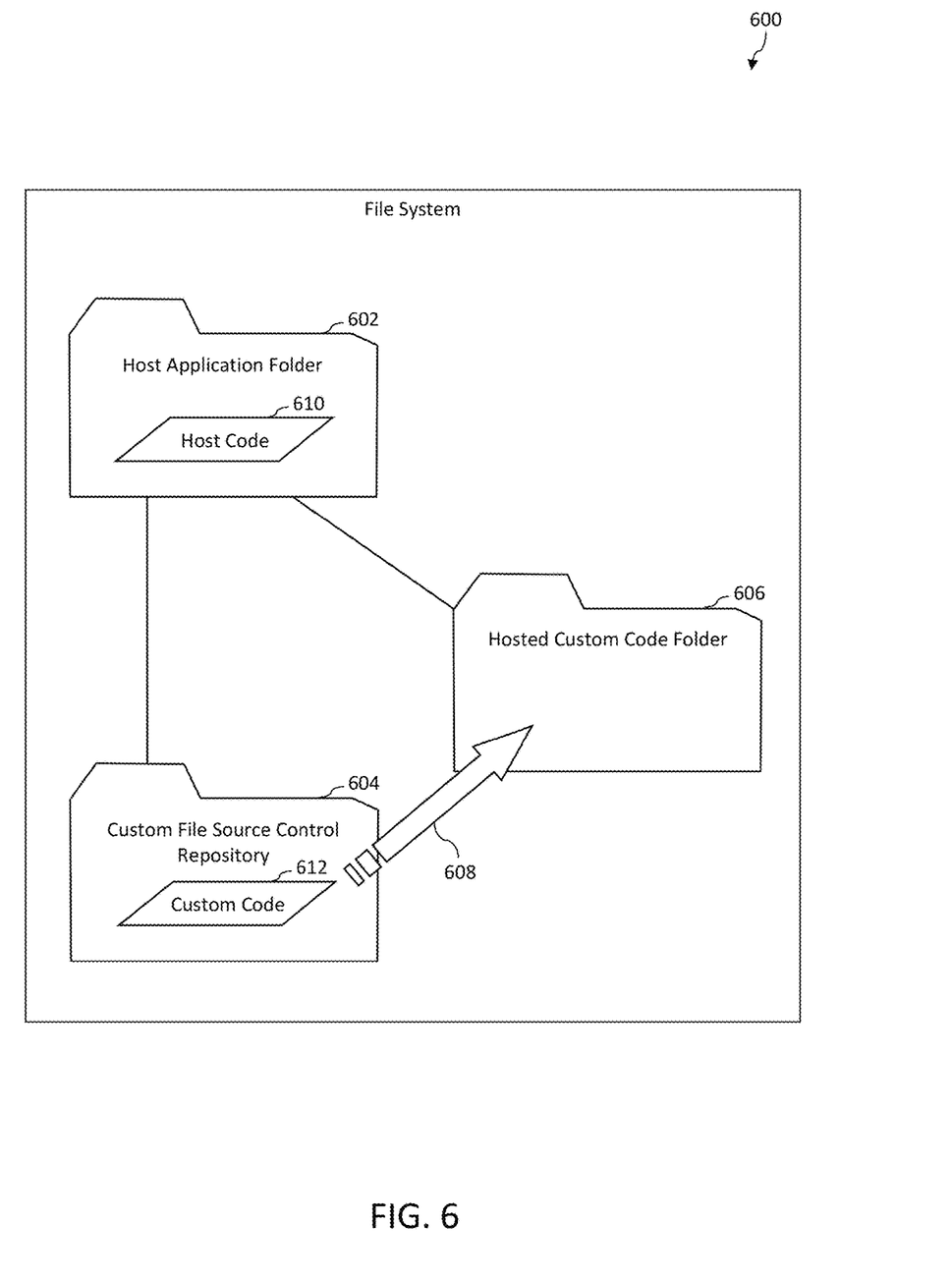
FIG. 6 depicts an example implementation of a file system shown in FIG. 2 in accordance with an embodiment.

FIG. 6 depicts an example file system 600 in accordance with an embodiment. For instance, file system 600 may be an example implementation of file system 200 shown in FIG. 2. File system 600 includes a host application folder 602, a custom file source control repository 604, and a hosted custom code folder 606. Host application folder 602 is shown to be a parent folder, and custom file source control repository 604 and hosted custom code folder 606 are shown to be sub-folders of host application folder 602, though the scope of the example embodiments is not limited in this respect.

Host application folder includes host code 610, which defines a runtime. Custom file source control repository 604 includes the custom code 612. Custom file source control repository 604 is configured to be accessible by a software developer who provides the custom code 612 for purposes of source control. For instance, the software developer may access the custom code 612 in custom file source control repository 604 and make changes to the custom code 612 therein.

Hosted custom code folder 606 is configured to maintain a copy of the custom code 612 from custom file source control repository 604, as depicted by arrow 608. When a change is made to the custom code 612 in custom file source control repository 604, the same change is made to the copy of the custom code 612 that is in hosted custom code folder 606. The copy of the custom code 612 in hosted custom code folder 606 is accessible by the runtime, so that the runtime can load the copy of the custom code 612 from the hosted custom code folder 606 into the runtime while the runtime is running. Changes that are made to the copy of the custom code 612 in hosted custom code folder 606 do not interfere with execution of the runtime.

It should be noted that host application folder 602 and hosted custom code folder 606 are configured to be non-controllable by the software developer. Accordingly, the software developer cannot control the host code 610 in host application folder 602, and the software developer cannot control the copy of the custom code 612 in hosted custom code folder 606. Even if the software developer happens to gain temporary access to the host code 610, for example, the custom code-enabled BaaS module (e.g., custom code-enabled BaaS module 108, 200, or 500) is capable of resetting the host code 610 to a known state, which is controlled entirely by the custom code-enabled BaaS module. Of course, any changes that the software developer makes to the custom code 612 in custom file source control repository 604 will be reflected in the copy of the custom code 612 in hosted custom code folder 606 as described above.

Any one or more of user systems 102A-102M, any one or more of servers 106A-106N, application developer system 110, custom code-enabled BaaS module 108, interface 202, resource provider 204, source control manager 220, runtimes 210A-210C, file system 222, request pipeline 212, third-party module(s) 214, service(s) 216, resource provider 502, runtime 504, provisioning logic 506, selective source control logic 508, storing logic 510, determination logic 512, modification logic 514, flowchart 300, and/or flowchart 400 may be implemented in hardware, software, firmware, or any combination thereof.

For example, any one or more of user systems 102A-102M, any one or more of servers 106A-106N, application developer system 110, custom code-enabled BaaS module 108, interface 202, resource provider 204, source control manager 220, runtimes 210A-210C, file system 222, request pipeline 212, third-party module(s) 214, service(s) 216, resource provider 502, runtime 504, provisioning logic 506, selective source control logic 508, storing logic 510, determination logic 512, modification logic 514, flowchart 300, and/or flowchart 400 may be implemented as computer program code configured to be executed in one or more processors.

In another example, any one or more of user systems 102A-102M, any one or more of servers 106A-106N, application developer system 110, custom code-enabled BaaS module 108, interface 202, resource provider 204, source control manager 220, runtimes 210A-210C, file system 222, request pipeline 212, third-party module(s) 214, service(s) 216, resource provider 502, runtime 504, provisioning logic 506, selective source control logic 508, storing logic 510, determination logic 512, modification logic 514, flowchart 300, and/or flowchart 400 may be implemented as hardware logic/electrical circuitry.

For instance, in an embodiment, one or more of user systems 102A-102M, one or more of servers 106A-106N, application developer system 110, custom code-enabled BaaS module 108, interface 202, resource provider 204, source control manager 220, runtimes 210A-210C, file system 222, request pipeline 212, third-party module(s) 214, service(s) 216, resource provider 502, runtime 504, provisioning logic 506, selective source control logic 508, storing logic 510, determination logic 512, modification logic 514, flowchart 300, and/or flowchart 400 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 7:
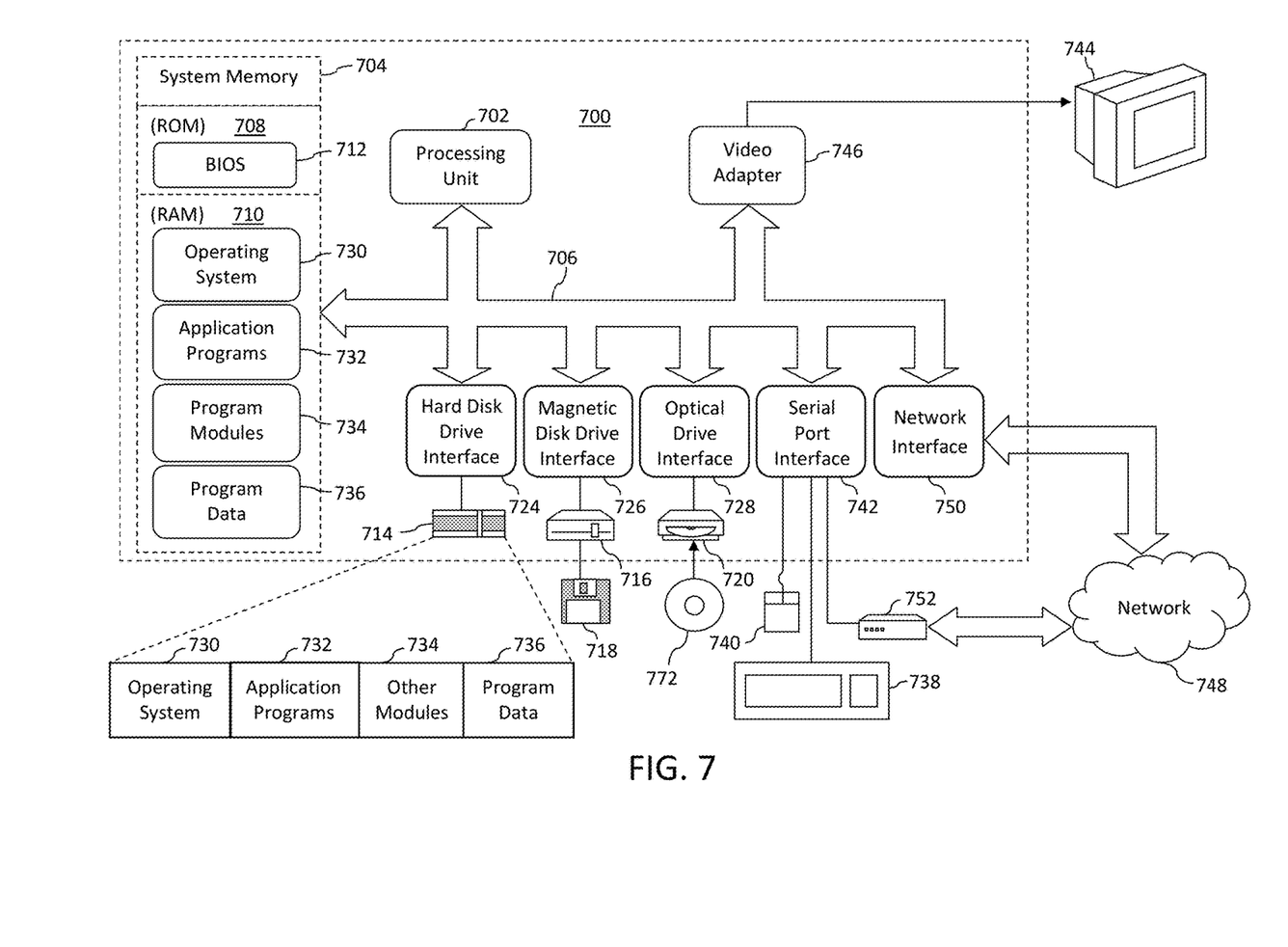
FIG. 7 depicts an example computer in which embodiments may be implemented.

FIG. 7 depicts an example computer 700 in which embodiments may be implemented. Any one or more of user systems 102A-102M, any one or more of file servers 106A-106N, and/or application developer system 110 shown in FIG. 1 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 772 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of custom code-enabled BaaS module 108 interface 202, resource provider 204, source control manager 220, runtimes 210A-210C, file system 222, request pipeline 212, third-party module(s) 214, service(s) 216, resource provider 502, runtime 504, provisioning logic 506, selective source control logic 508, storing logic 510, determination logic 512, modification logic 514, flowchart 300 (including any step of flowchart 300), and/or flowchart 400 (including any step of flowchart 400), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium," "computer-readable medium," and "computer-readable storage medium" are used to generally refer to media such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
receiving custom code from a user for incorporation into a backend-as-a-service module that is configured to provide a backend service to a corresponding application; and
providing source control of the custom code for the user without providing source control of host code for the user, the host code defining a runtime that is hosted by the backend-as-a-service module, the host code configured to load the custom code into the runtime while the runtime is running to provide custom backend features that are defined by the custom code to the corresponding application.

2. The method of claim 1, wherein receiving the custom code comprises:
receiving the custom code from the user via a resource provider that provisions the runtime.

3. The method of claim 1, wherein receiving the custom code comprises:
receiving the custom code from the user via a source control application programming interface (API).

4. The method of claim 1, further comprising:
storing the host code in a parent folder of a file system, the parent folder including at least a first sub-folder and a second sub-folder;
storing a source controlled copy of the custom code in the first sub-folder, the source controlled copy being a copy of the custom code for which source control functionality is provided for the user; and
copying the custom code from the first sub-folder to the second sub-folder, said copying comprising:
causing the custom code to be accessible to the runtime for loading into the runtime.

5. The method of claim 4, further comprising:
determining that one or more files are added to the source controlled copy of the custom code in the first sub-folder; and
copying the one or more files from the first sub-folder to the second sub-folder while the runtime is running in response to determine that the one or more files are added to the source controlled copy.

6. The method of claim 4, further comprising:
determining that one or more files are deleted from the source controlled copy of the custom code in the first sub-folder; and
deleting the one or more files from the custom code in the second sub-folder while the runtime is running in response to determine that the one or more files are deleted from the source controlled copy.

7. The method of claim 4, further comprising:
determining that at least one change is made to at least one file in the source controlled copy of the custom code in the first sub-folder; and
updating the corresponding at least one file in the second sub-folder to include the at least one change while the runtime is running in response to determine that the at least one change is made to the at least one file in the source controlled copy.

8. A system comprising:
at least one element including at least one of (a) one or more processors or (b) hardware logic/electrical circuitry;
an interface, implemented using the at least one element, configured to receive custom code from a user for incorporation into a backend-as-a-service module that is configured to provide a backend service to a corresponding application; and
selective source control logic, implemented using the at least one element, configured to provide source control of the custom code for the user without providing source control of host code for the user, the host code defining a runtime that is hosted by the backend-as-a-service module, the host code configured to load the custom code into the runtime while the runtime is running to provide custom backend features that are defined by the custom code to the corresponding application.

9. The system of claim 8, wherein the interface is a non-source control application programming interface (API).

10. The system of claim 8, wherein the interface is a source control application programming interface (API).

11. The system of claim 8, further comprising:
storing logic configured to cause the host code to be stored in a parent folder of a file system, the parent folder including at least a first sub-folder and a second sub-folder;
wherein the storing logic is further configured to cause a source controlled copy of the custom code to be stored in the first sub-folder, the source controlled copy being a copy of the custom code for which source control functionality is provided for the user; and
wherein the storing logic is further configured to copy the custom code from the first sub-folder to the second sub-folder to cause the custom code to be accessible to the runtime for loading into the runtime.

12. The system of claim 11, further comprising:
determination logic configured to determine whether one or more files are added to the source controlled copy of the custom code in the first sub-folder; and
modification logic configured to copy the one or more files from the first sub-folder to the second sub-folder while the runtime is running in response to a determination that the one or more files are added to the source controlled copy.

13. The system of claim 11, further comprising:
determination logic configured to determine whether one or more files are deleted from the source controlled copy of the custom code in the first sub-folder; and
modification logic configured to delete the one or more files from the custom code in the second sub-folder while the runtime is running in response to a determination that the one or more files are deleted from the source controlled copy.

14. The system of claim 11, further comprising:
determination logic configured to determine whether at least one change is made to at least one file in the source controlled copy of the custom code in the first sub-folder; and
modification logic configured to update the corresponding at least one file in the second sub-folder to include the at least one change while the runtime is running in response to a determination that the at least one change is made to the at least one file in the source controlled copy.

15. A computer program product comprising a computer-readable storage medium having computer program logic recorded thereon for enabling a processor-based system to provide source control of custom code in a backend-as-a-service module, the computer program product comprising:
a first program logic module for enabling the processor-based system to provide the source control of the custom code for a user without providing source control of host code for the user, the custom code received from a user for incorporation into the backend-as-a-service module which is configured to provide a backend service to a corresponding application, the host code defining a runtime that is hosted by the backend-as-a-service module, the host code configured to load the custom code into the runtime while the runtime is running to provide custom backend features that are defined by the custom code to the corresponding application;
a second program logic module for enabling the processor-based system to cause the host code to be stored in a parent folder of a file system, the parent folder including at least a first sub-folder and a second sub-folder;
a third program logic module for enabling the processor-based system to cause a source controlled copy of the custom code to be stored in the first sub-folder, the source controlled copy being a copy of the custom code for which source control functionality is provided for the user; and
a fourth program logic module for enabling the processor-based system to copy the custom code from the first sub-folder to the second sub-folder to cause the custom code to be accessible to the runtime for loading into the runtime.

16. The computer program product of claim 15, wherein the custom code is received from the user via a non-source control application programming interface (API).

17. The computer program product of claim 15, wherein the custom code is received from the user via a source control application programming interface (API).

18. The computer program product of claim 15, further comprising:
a fifth program logic module for enabling the processor-based system to determine whether one or more files are added to the source controlled copy of the custom code in the first sub-folder; and
a sixth program logic module for enabling the processor-based system to copy the one or more files from the first sub-folder to the second sub-folder while the runtime is running in response to a determination that the one or more files are added to the source controlled copy.

19. The computer program product of claim 15, further comprising:
- a fifth program logic module for enabling the processor-based system to determine whether one or more files are deleted from the source controlled copy of the custom code in the first sub-folder; and
- a sixth program logic module for enabling the processor-based system to delete the one or more files from the custom code in the second sub-folder while the runtime is running in response to a determination that the one or more files are deleted from the source controlled copy.

20. The computer program product of claim 15, further comprising:
- a fifth program logic module for enabling the processor-based system to determine whether at least one change is made to at least one file in the source controlled copy of the custom code in the first sub-folder are changed; and
- a sixth program logic module for enabling the processor-based system to update the corresponding at least one file in the second sub-folder to include the at least one change while the runtime is running in response to a determination that the at least one change is made to the at least one file in the source controlled copy.

* * * * *